United States Patent
Saba

(10) Patent No.: US 6,464,520 B2
(45) Date of Patent: Oct. 15, 2002

(54) CONNECTOR

(75) Inventor: Toshikazu Saba, Yokkaichi (JP)

(73) Assignee: Sumitomo Wiring Systems, Ltd. (JP)

(*) Notice: Subject to any disclaimer, the term of this patent is extended or adjusted under 35 U.S.C. 154(b) by 0 days.

(21) Appl. No.: 09/874,629

(22) Filed: Jun. 5, 2001

(65) Prior Publication Data

US 2002/0058436 A1 May 16, 2002

(30) Foreign Application Priority Data

Nov. 16, 2000 (JP) .......................... 2000-350028

(51) Int. Cl.[7] .......................... H01R 4/60; H01R 4/64; H01R 25/00; H01R 27/02
(52) U.S. Cl. ..................................... 439/191; 439/654
(58) Field of Search ................. 439/190, 191, 439/654

(56) References Cited

U.S. PATENT DOCUMENTS

| | | | | |
|---|---|---|---|---|
| 2,331,615 A | * | 10/1943 | Meyer .......................... 285/97.3 |
| 2,857,576 A | * | 10/1958 | Ueckert ........................ 339/16 |
| 2,989,960 A | * | 6/1961 | Hay ............................ 128/188 |
| 3,624,594 A | * | 11/1971 | Trimble ....................... 339/16 |
| 4,063,790 A | * | 12/1977 | Kleykamp et al. ............. 339/16 |
| 4,088,381 A | * | 5/1978 | Harnett ........................ 339/94 |
| 4,919,621 A | * | 4/1990 | Ams ............................ 439/191 |
| 4,946,393 A | * | 8/1990 | Borgstrom et al. ........... 439/88 |
| 5,082,449 A | * | 1/1992 | Borgstrom et al. ........... 439/88 |
| 5,221,214 A | * | 6/1993 | Martin ......................... 439/191 |
| 5,346,405 A | | 9/1994 | Mosser, III et al. |
| 5,370,543 A | | 12/1994 | Hamada et al. |
| 5,498,163 A | * | 3/1996 | Takamura et al. ............ 439/13 |
| 5,658,159 A | * | 8/1997 | Gardnert et al. ............. 439/294 |
| 5,670,884 A | | 9/1997 | Kodama |
| 5,791,924 A | * | 8/1998 | Tailon et al. ................. 439/191 |
| 5,795,169 A | * | 8/1998 | Reed ........................... 439/191 |
| 5,833,482 A | * | 11/1998 | Buchter ....................... 439/288 |
| 5,944,547 A | | 8/1999 | Golab et al. |
| 6,036,515 A | | 3/2000 | Nakamura |
| 6,039,589 A | | 3/2000 | LaLange et al. |
| 6,066,001 A | | 5/2000 | Liptak et al. |
| 6,145,597 A | * | 11/2000 | Kobylinsky ................. 166/384 |
| 6,241,547 B1 | | 6/2001 | Fukuda |
| 6,257,922 B1 | | 7/2001 | Shinozaki |

FOREIGN PATENT DOCUMENTS

JP    6-310220    11/1994

* cited by examiner

Primary Examiner—P. Austin Bradley
Assistant Examiner—Edwin A. León
(74) Attorney, Agent, or Firm—Anthony J. Casella; Gerald E. Hespos

(57) ABSTRACT

Connectors (33, 45, 52) are connected to each other when joints (15) that connect tubes (14) and pipes (20, 40) to each other are mounted thereon. The connectors (33, 45, 52) are disconnected from each other when the joints (15) are removed therefrom. A detection circuit (8) detects an electrical disconnection between terminals (70) and (33) in the connectors (52) and (33B), respectively and outputs an alarm signal to inform an operator that the joint (15) has not been installed on the tube (14) or the pipe (20, 40).

3 Claims, 16 Drawing Sheets

CONNECTOR

BACKGROUND OF THE INVENTION

1. Field of the Invention

The present invention relates to a connector.

2. Description of the Related Art

Blow-by gas is gas that has leaked from the space between a cylinder of an engine and the piston. A blow-by gas collection piping is mounted on a vehicle and has a plurality of tubes that connect an engine and an air intake duct to each other. Thus, the blow-by gas collection piping feeds the blow-by gas back to the air intake duct to prevent the blow-by gas from being discharged to the atmosphere. Maintenance of the vehicle may require the tubes to be disconnected from each other. A visual check then is performed to determine whether the tubes have been returned to their original positions.

However, the engine operates even if the tubes have not been returned to their original positions. In this case, the blow-by gas is discharged to the atmosphere by driving the engine without noticing that the tubes are disconnected from each other.

SUMMARY OF THE INVENTION

The present invention has been made in view of the above-described situation. Accordingly, it is an object of the present invention to provide a connector that can be utilized for a system to determine whether tubes have been disconnected from each other.

The connector of the present invention comprises two connector housings that can be fitted on each other, and that are immoveable in an axial direction of a pair of tubes. Metal terminal fittings accommodated separately in the respective connector housings are connected to each other by connecting the tubes to each other.

In this construction, the terminal fittings are connected to each other when the tubes are connected to each other. Conversely, the terminal fittings are disconnected from each other when the tubes are disconnected from each other. Thus, the connector can be utilized as part of a system to determine whether or not the tubes have been disconnected from each other, by detecting the connection state of the terminal fittings.

Preferably, several pairs of connector housings are connected in parallel with a detection circuit for detecting an electrical connection between the terminal fittings. Thus it is possible to detect instantly which of the housings has been disconnected.

At least one of the connector housings may have a rotatable ring through which a tube is inserted, and the connector housing is rotatable on the rotatable ring. Thus, irrespective of whether the tube twists, the connector housings can be moved to face each other connector housing, and it is easy to fit both connector housings on each other.

At least one of the connector housings may be integral with a joint that is installed on an end of a tube and removably installed on a mating tube. The joint has a double cylindrical wall. One cylindrical wall is fitted on an inner side of the tube, and the other is fitted an outer side thereof. A flexible clamping portion is provided by forming a slit on an outer cylindrical wall of the double cylindrical wall to deform a part of the outer cylindrical wall flexibly inward. A clamping ring is fit on the outer side of the double cylindrical wall and slides between a clamping position, at which the flexible clamping portion deforms flexibly inwardly, and a non-clamping position distant from the clamping position. A locking portion is formed on the double cylindrical wall to lock the clamping ring to the clamping position.

In this construction, the joint on the connector housing is mounted on a tube by inserting an end of the tube between the outer cylindrical wall of the double cylindrical wall and the inner cylindrical wall thereof. The clamping ring then is moved from the non-clamping position to the clamping position to lock the clamping ring to the locking portion. Consequently, the clamping ring flexes the flexible clamping portion inward and the flexible clamping portion clamps the tube. Thus, it is possible to prevent a slip-off of the tube, and the joint portion can be unremovably mounted on the tube by merely moving the clamping ring from the non-clamping position to the clamping position.

The connector housing may further comprise a temporary locking mechanism for locking the clamping ring to the non-clamping position. Thus, it is possible to prevent the operator from forgetting to mount the clamping ring on the joint and to prevent the operator from erroneously moving the clamping ring to the clamping position before installation of the tube.

The joint may have an insertion cylinder for connecting a tube to be fit in the double cylindrical wall with a mating tube. The joint may also comprise a seal ring for a mating tube. The seal ring may be fit on a peripheral surface of the insertion cylinder. The joint may further comprise a double cylindrical construction formed between a peripheral surface of the insertion cylinder and the rotatable ring that is removably mounted on the insertion cylinder such that the mating tube can be fit into the double cylindrical construction.

BRIEF DESCRIPTION OF THE DRAWINGS

FIG. 2 is an exploded perspective view showing the joint, the pipe, and the connector portions provided thereon.

DETAILED DESCRIPTION OF THE PREFERRED EMBODIMENTS

Figure 1:
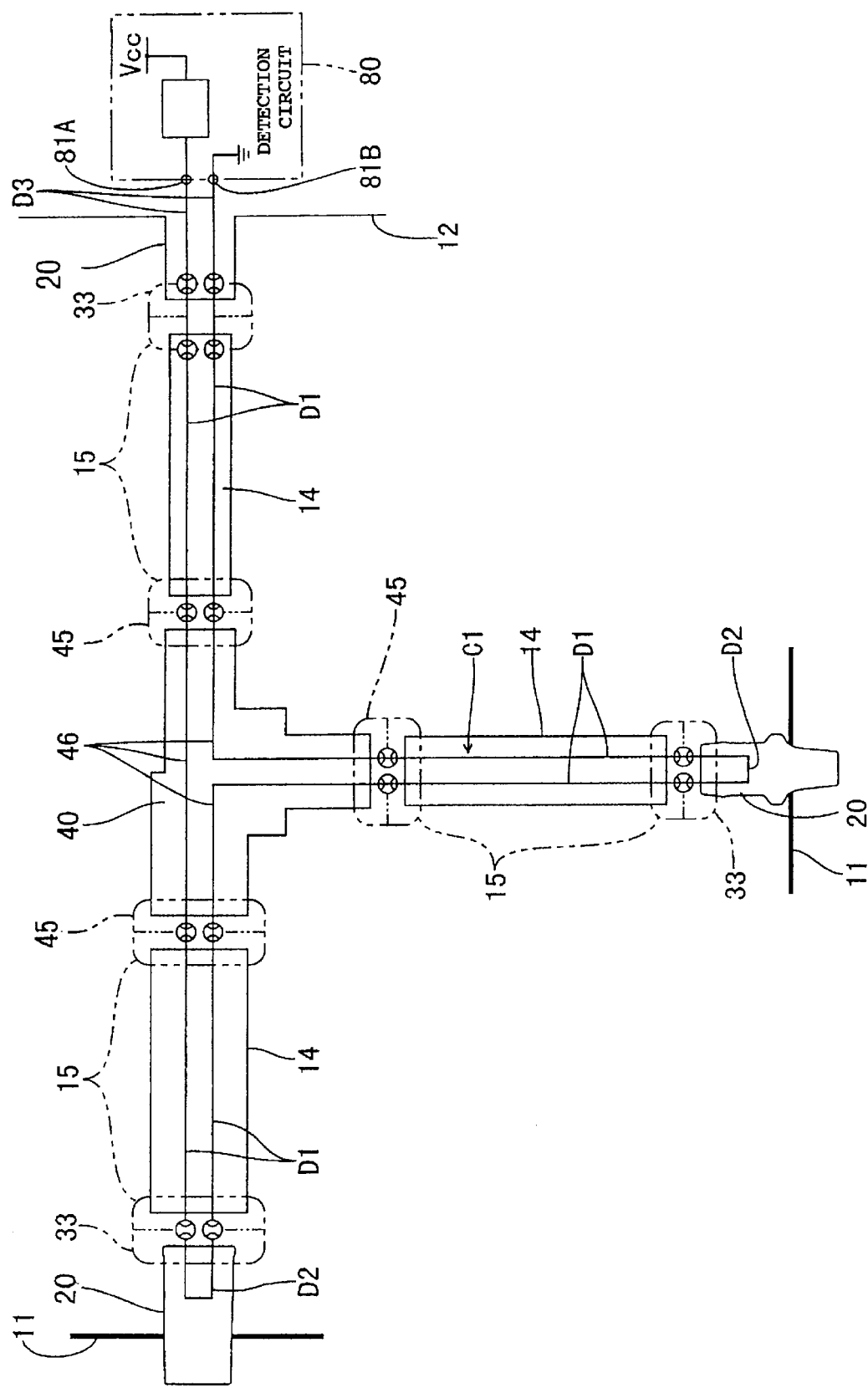
FIG. 1 is a concept view showing piping for a blow-by gas according to a first embodiment of the present invention.

FIG. 1 shows a blow-by gas collection piping for an engine of a vehicle. The piping has a tube 14 connecting a crankcase 11 of an engine in which the blow-by gas can be generated to an air intake duct 12 for the engine.

More specifically, pipes 20 extend from two positions of a crankcase 11 and one position of an air intake duct 12. Joints 15 are fixed to both ends of each of three tubes 14. The joint 15 at one end of each tube 14 is connected to each pipe 20, while the joint 15 at the other end of each tube 14 is connected to each branch portion of a T-pipe 40.

Figure 2:
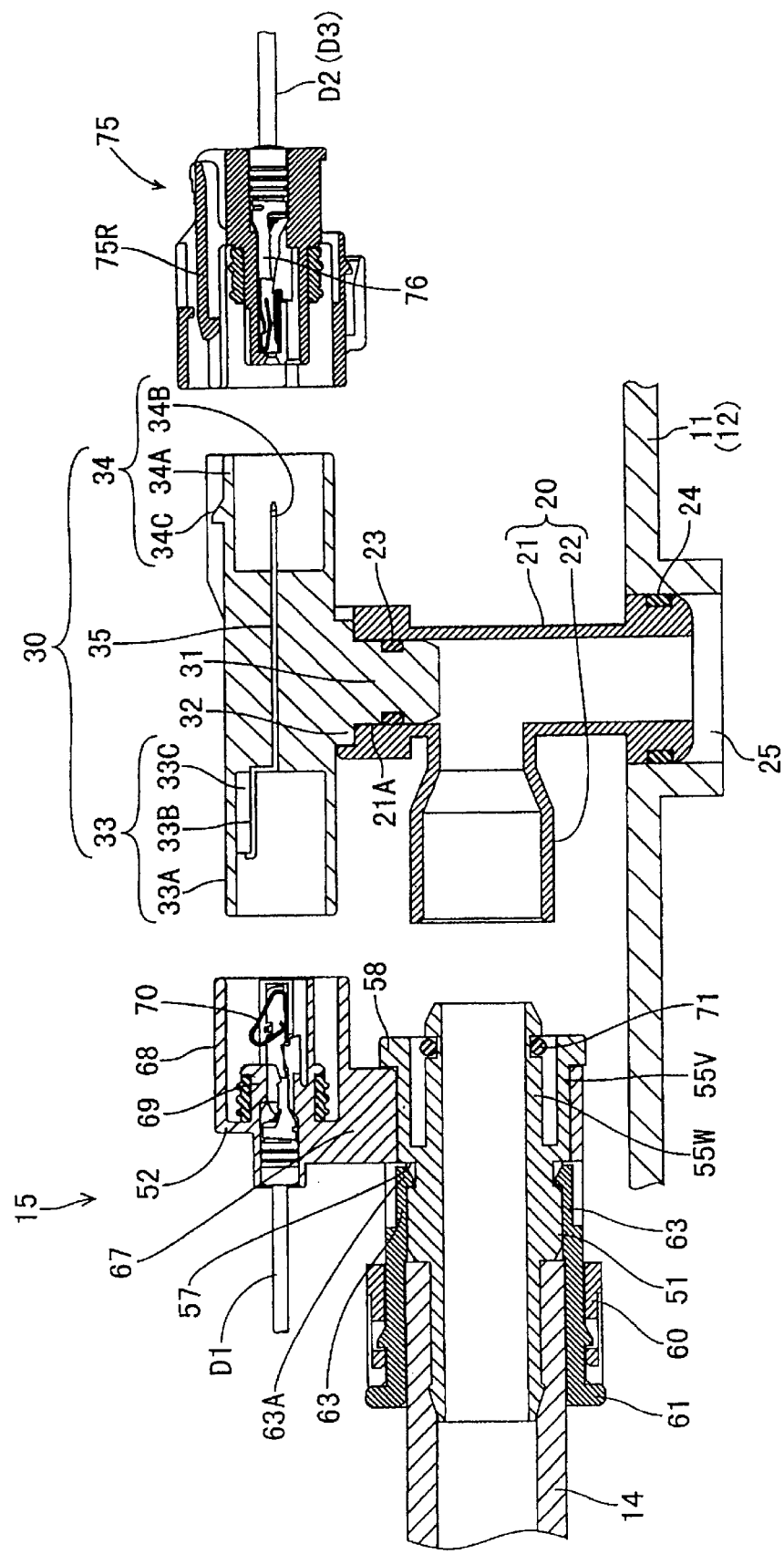
FIG. 2 is a sectional view showing a joint, a pipe, and connector portions provided thereon.
Figure 3:
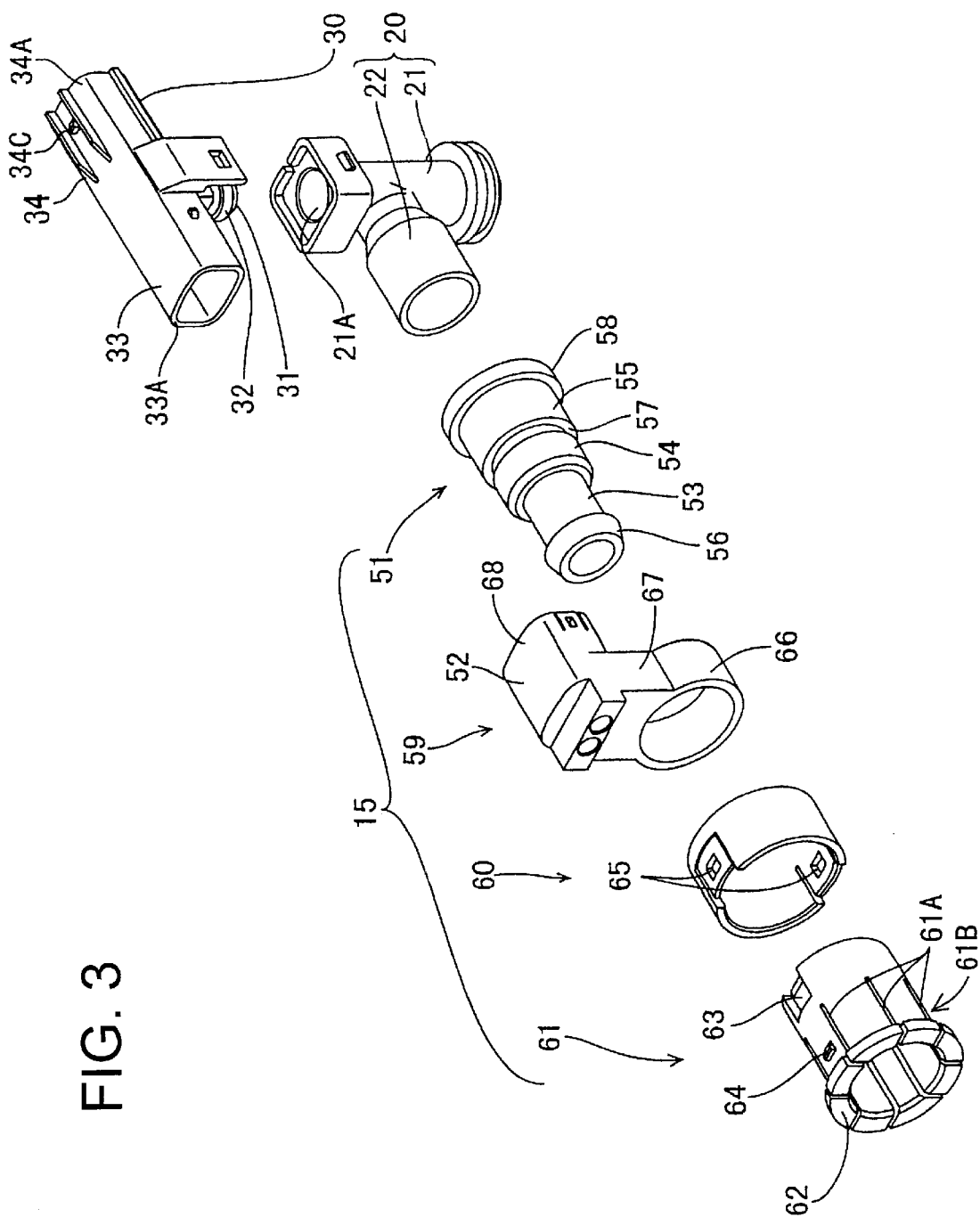

The joints 15 are made of resin. As shown in FIG. 2, each joint 15 has a main cylinder 51 to be fixedly fit in the respective tube 14. As shown in FIG. 3, the main cylinder 51 has a small-diameter portion 53, an intermediate-diameter portion 54, and a large-diameter portion 55 arranged sequentially from the side of the tube 14. A slip-off prevention convexity 56 is formed at the front end of the small-diameter portion 53. A locking groove 57 is formed between the intermediate-diameter portion 54 and the large-diameter portion 55.

The large-diameter portion 55 has a flange 58 projected from its front end at the side opposite to the intermediate-diameter portion 54. As shown in FIG. 2, the large-diameter portion 55 has a double construction. The pipes 20, 40 are fitted into the gap between an outer cylindrical wall 55V of the large-diameter portion 55 and an inner cylindrical wall 55W thereof. The inner cylindrical wall 55W projects slightly forward beyond the outer cylindrical wall 55V. An O-ring 71 is fitted on the inner cylindrical wall 55W at a position close to its front end, and is covered with the front portion of the outer cylindrical wall 55V.

A rotary member 59 and a clamping sleeve 61 are fitted on the main cylinder 51 in order from the side of the small-diameter portion 53. A clamping ring 60 is fitted on the outer surface of the clamping sleeve 61.

The clamping sleeve 61 has a flange 62 at one end. The clamping sleeve 61 has a plurality of slits 61A that extend axially from the end that has the flange to form a flexible clamping portion 61B that can flex radially inwardly or outwardly.

The clamping sleeve 61 has a pair of flexible piece s 63 (only one is shown in FIG. 3) at the end opposite the flange 62. The end of the clamping sleeve 61 with the flexible pieces 63 is fit on the main cylinder 51. A front-end projection 63A is formed on the flexible piece 63 and is locked to the locking groove 57 of the main cylinder 51 to prevent the clamping sleeve 61 from slipping off from the main cylinder 51. The clamping sleeve 61 and the small-diameter portion 53 are coaxially disposed with a gap provided therebetween to constitute a double cylindrical wall, as shown in FIG. 2.

Figure 4A:
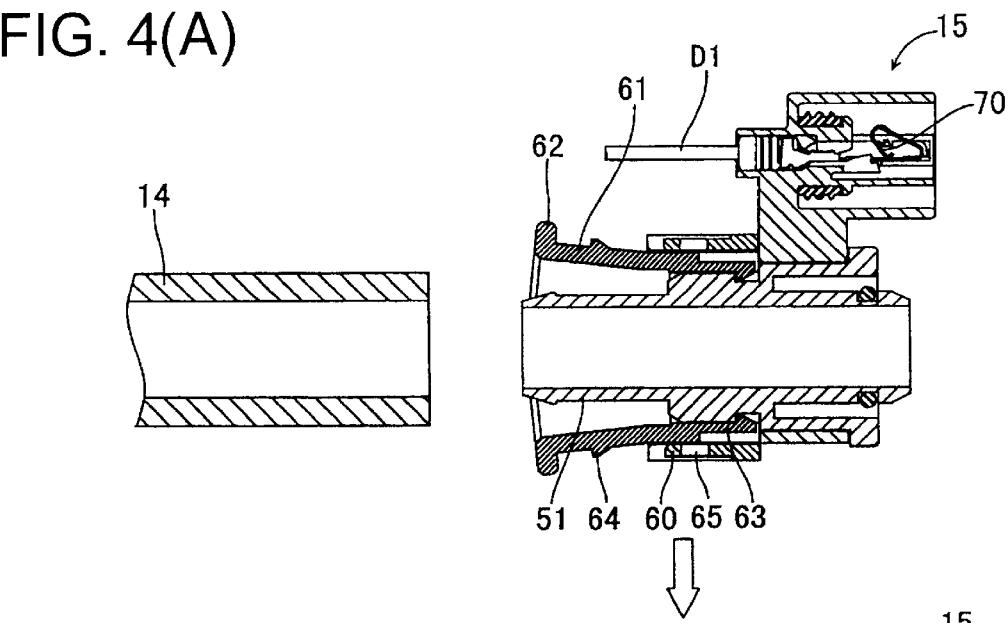
FIG. 4 is a side sectional view showing the procedure for installing the joint on a tube.
Figure 4B:
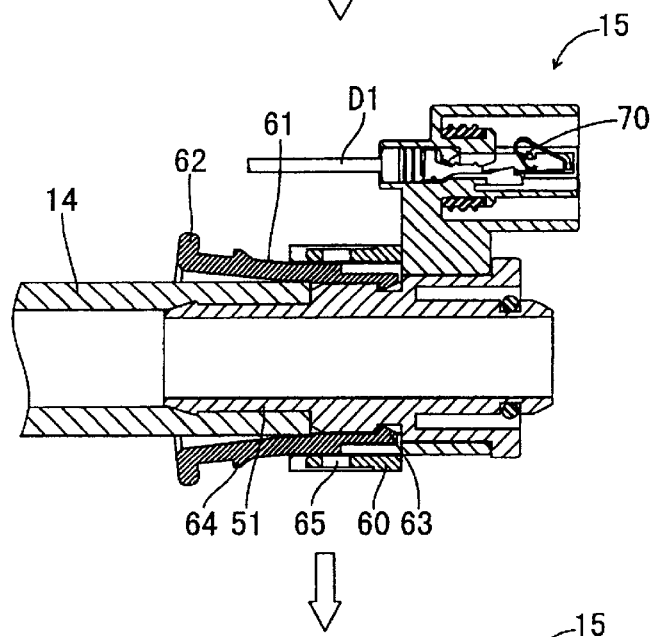
Figure 4C:
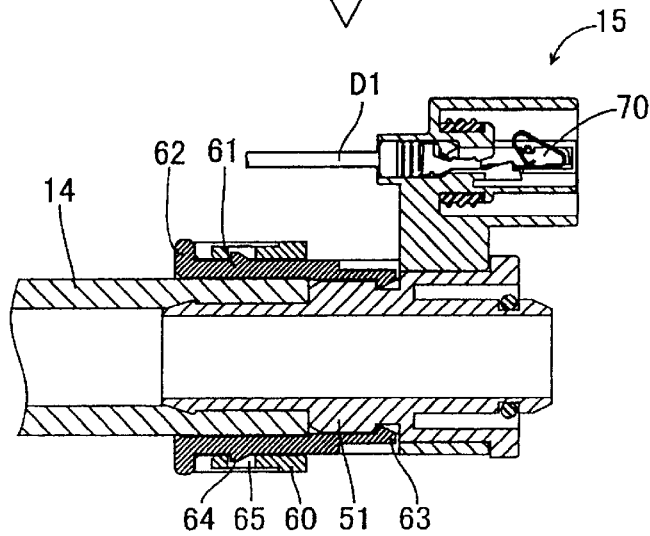

As shown in FIG. 4, the clamping ring 60 initially is disposed in a non-clamping position on the clamping sleeve 61 adjacent the flexible piece 63. In this state, the end of the clamping sleeve 61 adjacent the flange 63 is enlarged radially to insert the tube 14 into the gap between the clamping sleeve 61 and the main cylinder 51 (see FIG. 4B). Then, as shown in FIG. 4C, the clamping ring 60 is moved toward the flange 62 and into a clamping position where the tube 14 is clamped between the clamping sleeve 61 and the main cylinder 51 to prevent the tube 14 from slipping off. A locking recess 65 of the clamping ring 60 is locked to a projection 64 on the clamping sleeve 61 near the flange 62 to prevent the clamping ring 60 from returning to the original position.

As shown in FIG. 3, the rotary member 59 has a rotatable ring 66 and a square pillar 67 that extends from a part of the peripheral surface of a rotatable ring 66 to be fitted on the main cylinder 51. The rotatable ring 66 is sandwiched axially between the flange 58 of the main cylinder 51 and the end of the clamping sleeve 61 locked to the locking groove 57 to prevent the rotary member 59 from moving axially. However, the rotary member 59 can rotate on the main cylinder 51.

A female connector 52 is formed at the leading (upper) end of the pillar 67. As shown in FIG. 2, the female connector 52 has a hood 68 that opens in the same direction (the right side in FIG. 2) as the joint 15. A terminal accommodating portion 69 extends from the rear of the hood 68 toward the open side thereof, and two female terminal fittings 70 (only one is shown in FIG. 2) are accommodated side by side in the terminal accommodation portion 69.

The pipe 20 extending from the crankcase 11 and the air intake duct 12 will be described below. Referring to FIG. 2, the pipe 20 is made of resin and has a vertically extending main cylinder 21 and a horizontal part 22 extending leftward in FIG. 2 from a part of the main cylinder 21. A resin connector block 30 is connected to the upper end of the main cylinder 21. More specifically, a columnar portion 31 extends vertically from the connector block 30 and is fitted into an upper-end opening 21A of the pipe 20. A base 32 is formed on the columnar portion 31 and is connected to the upper-end opening 21A of the pipe 20 by vibration welding. An O-ring 23 is fit on the peripheral surface of the columnar portion 31 of the connector block 30 to seal the upper end of the main cylinder 21 completely.

An O-ring 24 is fitted on the peripheral surface of the lower end of the main cylinder 21 of the pipe 20, and the lower end of the main cylinder 21 is fit water-tightly in a hole 25 formed on a wall of the air intake duct 12 and that of the crankcase 11. Thus, the inner space of the pipe 20 communicates with the inner space of the air intake duct 12 and that of the crankcase 11.

The connector block 30 extends to the right and left direction in FIG. 2 with respect to the columnar portion 31. The connector block 30 has a first male connector 33 at the left side and a second male connector 34 at the right side. The first male connector 33 and the second male connector 34 have hoods 33A and 34A, respectively. The open direction of the hood 33A of the first male connector 33 at the left side in FIG. 2 is the same as that of the horizontal part 22. Two bus bars 35 (only one bus bar 35 is shown in FIG. 2) extend parallel with each other inside the connector block 30. Both ends of each bus bar 35 extend toward the open side from the rear surface of each hood 33A and 34A to constitute male terminal fittings 33B and 34B. More specifically, the male terminal fitting 33B in the first male connector 33 is laid on a supporting base 33C that projects inward from the ceiling surface of the hood 34A, such that the contact surface of the first male connector 33 faces down in FIG. 2. The male terminal fitting 34B of the second male connector 34 is cantilevered. A locking projection 34C is formed on an upper surface of the hood 34A of the second male connector 34, and a locking arm 75R formed on a mating female connector 75 is locked to the locking projection 34C.

Figure 5:
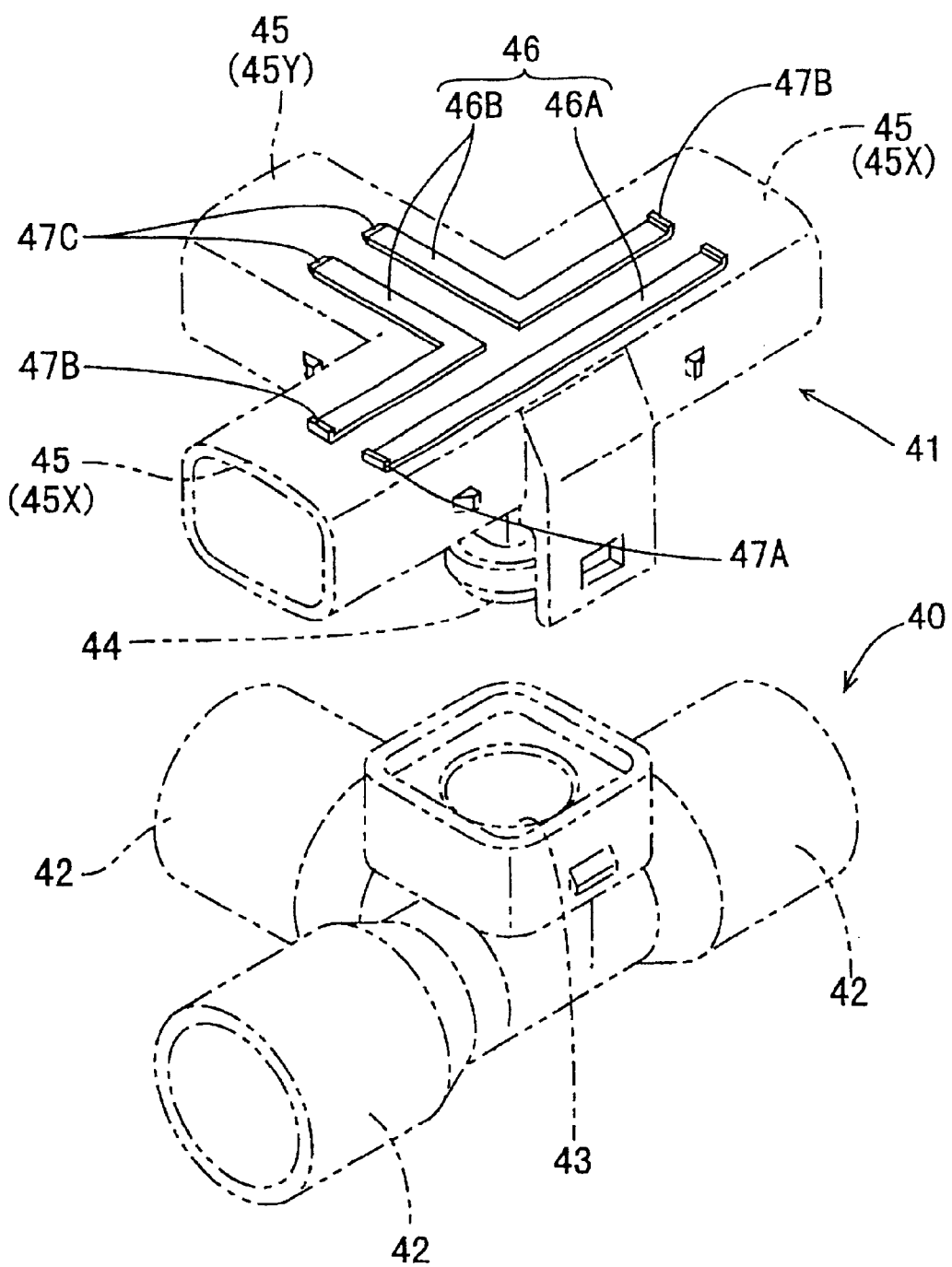
FIG. 5 is a perspective showing a T-pipe.

The T-pipe 40 of FIG. 5 also is made of synthetic resin, and a resin connector block 41 is installed on the T-pipe 40.

The T-pipe 40 is literally T-shaped and has connection pipes 42 (same shape as the horizontal part 22 of the pipe 20) extending in three directions. A receiving concavity 43 is formed upward on a common base of the connection pipes 42 of the T-pipe 40. A columnar portion 44 extends vertically from the connector block 41, and is fitted and welded into the receiving concavity 43 by vibration welding, as in the case of the pipe 20.

The connector block 41 is T-shaped in correspondence to the shape of the T-pipe 40 and has three branch portions parallel with the three connection pipes 42, respectively. The leading end of each branch portion has a third male connector 45 with the same construction as that of the first connector 33 on the pipe 20.

As shown in FIG. 5, three bus bars 46 are embedded in the connector block 41, namely, a first bus bar 46A and two second bus bars 46B. The first bus bar 46A extends straight between third male connectors 45X and 45X that face in opposite directions. Thus the first bus bar 46A forms one male terminal 47A of each third male connector 45X. The two second bus bars 46B, 46B are accommodated in a third male connector 45Y and constitute third male terminals 47C, 47C that are arranged adjacent with one end exposed. The second bus bars 46B, 46B are bent perpendicularly in opposite directions inside the connector block 41 to form the other male terminals 47B, 47B of the third male connectors 45X, 45X that face in opposite directions.

Figure 7:
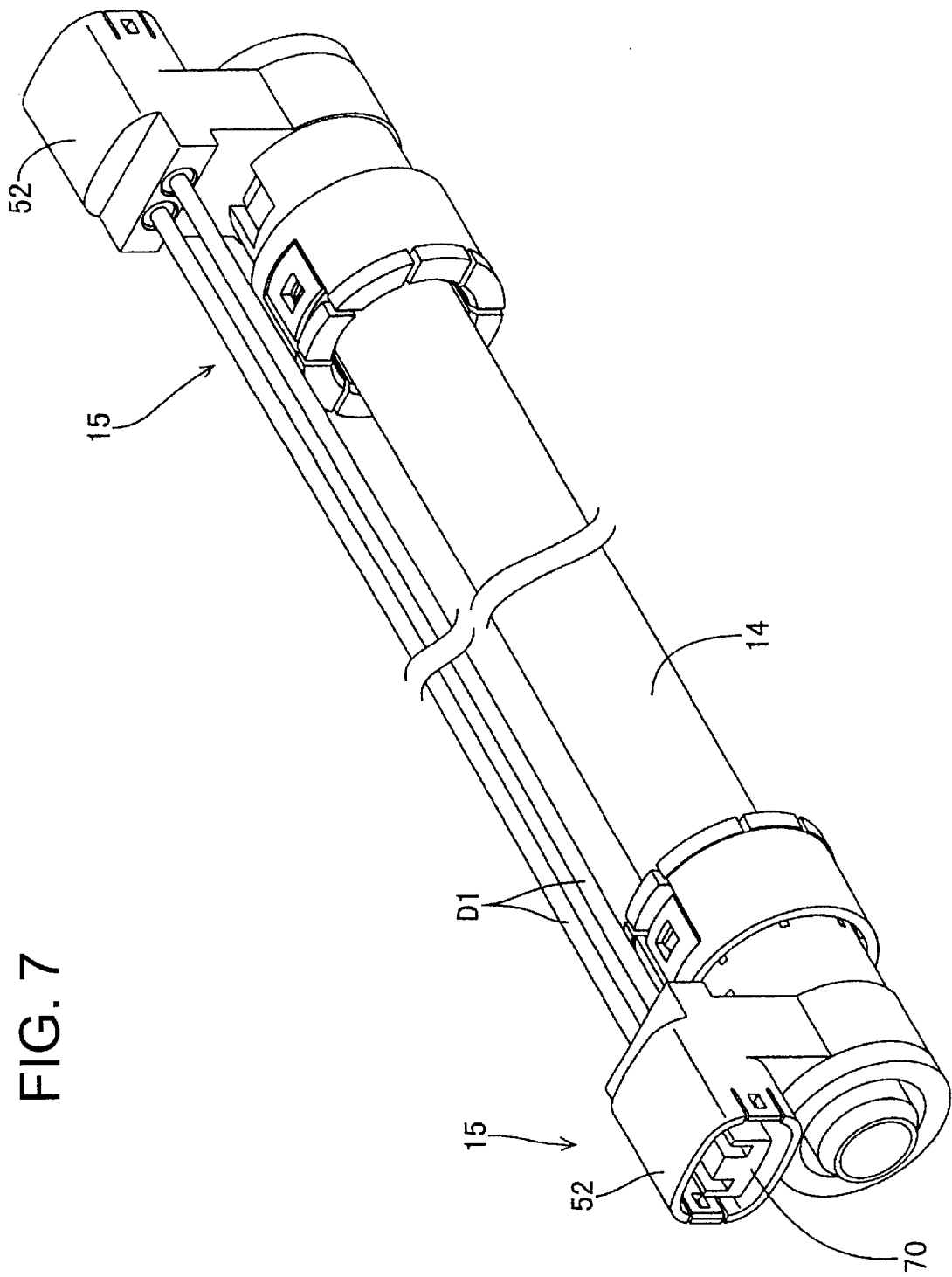
FIG. 7 is a perspective view showing a state in which the joint has been installed on both ends of the tube.

As described above with reference to FIG. 4, the joint 15 is installed at both ends of the tube 14. The terminal fitting 70 (see FIG. 2) is fixed to both terminals of each of a pair of electric wires D1 that has almost the same length as the tube 14. As shown in FIG. 7, the electric wires D1 are extended along the tube 14, and the terminal fittings 70 at the ends of each electric wire D1 are mounted inside the respective female connectors 52 connected to both ends of the tube 14. In this manner, three tubes 14 on which the joint 15 and other members have been mounted are prepared.

The joints 15 disposed respectively at the ends of the tubes 14 are connected to the pipe 20 at two positions of the crankcase 11 and to the pipe 20 at one position of the air intake duct 12. To this end, as shown in FIG. 2, the joint 15 is pressed against the horizontal part 22 of the pipe 20 with the joint 15 facing the horizontal part 22. Additionally, the female connector 52 of the joint 15 is pressed against the first male connector 33 with the joint 15 facing the first male connector 33. As a result, the joint 15 and the horizontal part 22 are fitted on each other to allow communication between the tube 14 and the crankcase 11 as well as the air intake duct 12. Additionally, the connectors 52 and 33 are connected to each other to allow an electrical connection between both terminal fittings 70 of the female connector 52 and the male terminal 33B (one end of bus bar 35) of the first male connector 33.

Then, the joint 15 at the other end of each tube 14 is installed on the T-pipe 40. To this end, the location of the joint 15 and the female connector 52 thereof are adjusted so that the former and the latter face the connection pipe 42 of the T-pipe 40 and the third male connector 45, respectively. Even though the tube 14 is twisted in an unexpected direction, it is easy to face the female connector 52 and the third male connector 45 toward each other by rotating the female connector 52.

Figure 6:
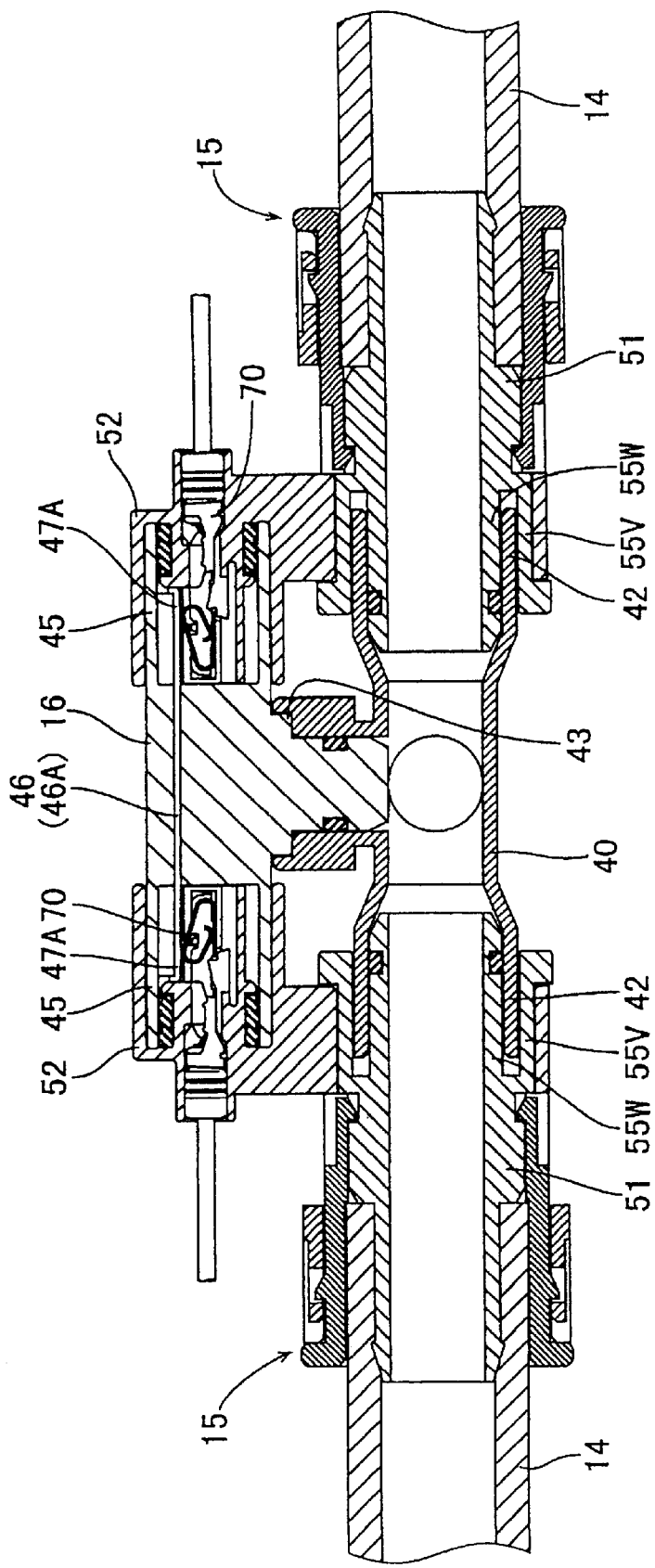
FIG. 6 is a side sectional view showing a state in which the joint has been connected to the T-pipe.

As shown in FIG. 6, the joint 15 is pressed against the T-pipe 40, so that the joint 15 and the connection pipe 42 are fit on each other to allow communication among the three tubes 14. At this time, the connectors 52 and 45 are connected to each other to allow an electrical connection between both terminal fittings 70 of the female connector 52 and the male terminals (each end of bus bar 46) of the third male connector 45.

Figure 8:
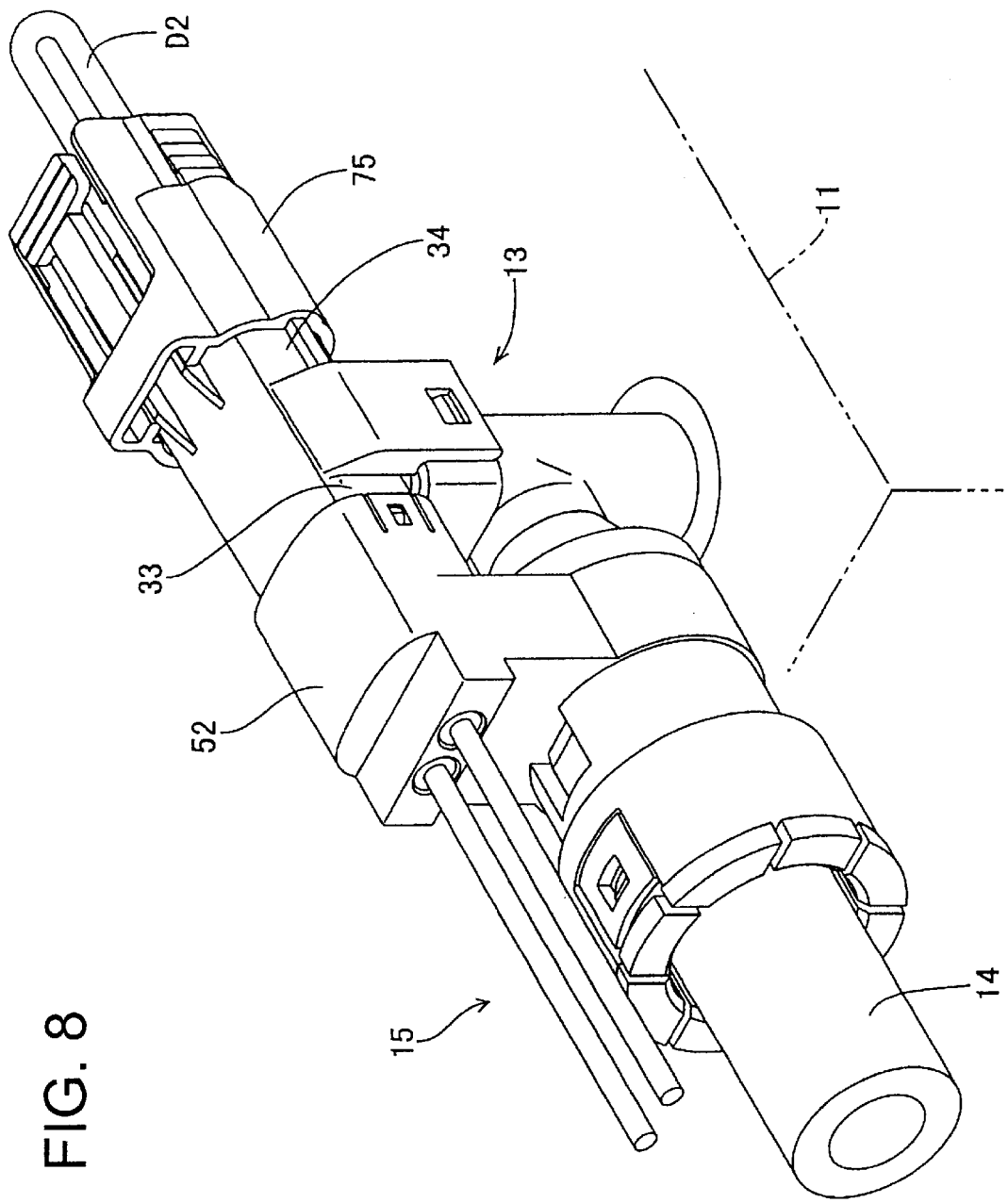
FIG. 8 is a perspective view showing a state in which the joint and the pipe have been connected to each other.

Then, as shown in FIG. 8, the female connector 75 is connected to the second male connector 34 of each pipe 20 on the crankcase 11. The female connector 75 accommodates a pair of female terminal fittings (not shown). The female terminal fittings are short-circuited with an electric wire D2 to short-circuit both male terminals 34B and 34B inside the second male connector 34.

Figure 9:
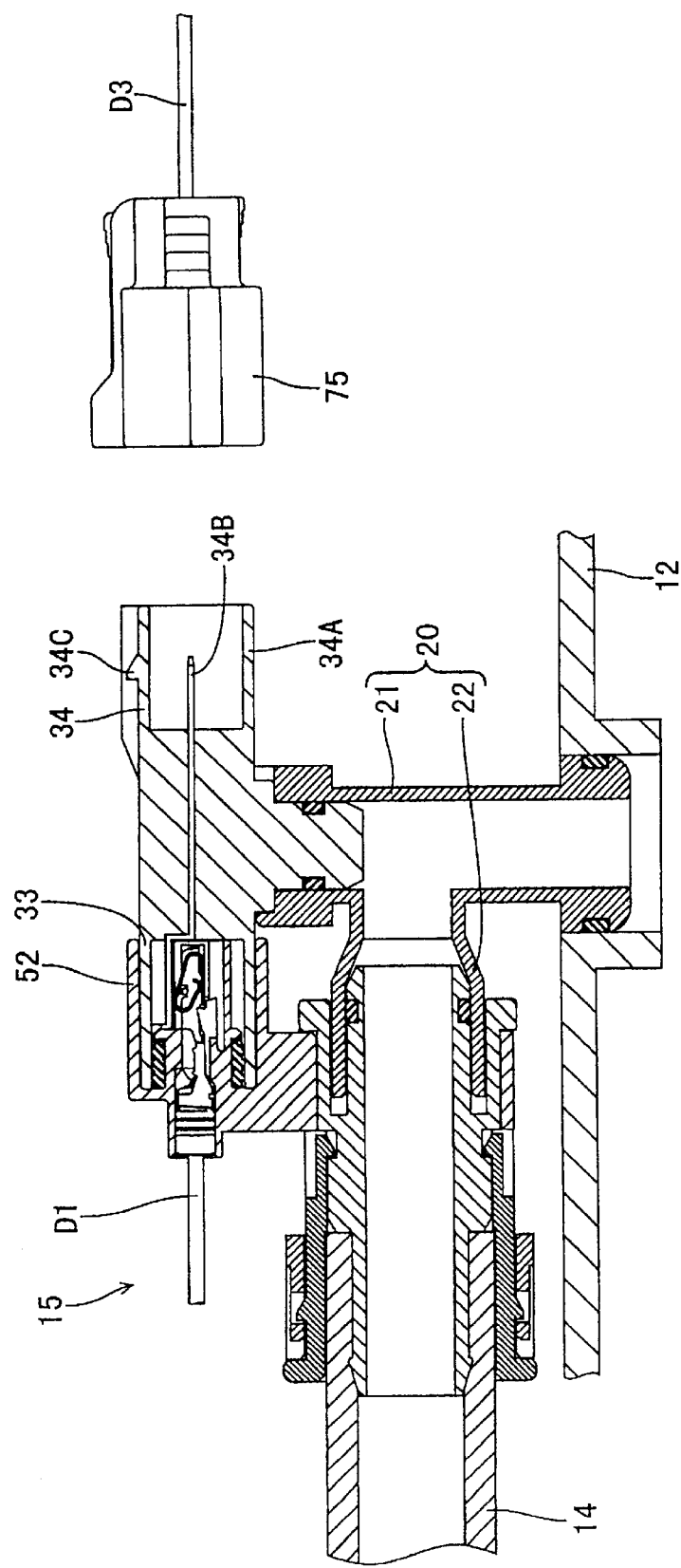
FIG. 9 is a side sectional view showing the state in which the joint and the pipe have been connected to each other.

Finally, as shown in FIG. 9, the female connector 75 is connected to the second male connector 34 of each pipe 20 provided on the air intake duct 12. Electric wires D3 and D3 are connected to the detection circuit 80 (see FIG. 1) and are fixed to a pair of female terminal fittings 76 (see FIG. 2) accommodated in the female connector 75. The detection circuit 80 is constructed to output an alarm signal when the detection terminals 81A and 81B to which the electric wires D3 and D3 have been connected are insulated from each other. However, the detection circuit 80 does not output the alarm signal when the detection terminals 81A and 81B are short-circuited.

The system of the first embodiment operates as described below.

The engine and the detection circuit 80 are actuated when the ignition key of the vehicle is turned on. The tubes 14 of the blow-by gas collection piping can be connected to each other with the joints 15 in the condition shown in FIG. 1. In this condition, a closed circuit (hereinafter referred to as "keying circuit C1") composed of the electric wires D1 through D3 and the bus bars 35, 46 is connected to a pair of the detection terminals 81A, 81B of the detection circuit 80. As a result, both detection terminals 81A and 81B of the detection circuit 80 are short-circuited, and, consequently, the detection circuit 80 does not output the alarm signal.

No alarm signal is outputted if the joints 15 are connected to the tubes 14, and it is possible to drive the vehicle normally. A load applied to the engine while the vehicle is traveling generates blow-by gas, and the blow-by gas is sucked by a negative pressure of the air intake duct 12 and fed back to the engine and not discharged to the atmosphere.

Maintenance of the vehicle may require the joints 15 to be disconnected from the tubes 14. In some situations, a plurality of the joints 15 may be disconnected from the tubes 14 for the maintenance of the vehicle. In this situation, an operator may forget to connect one of the joints 15 to the tubes 14. Thus, the blow-by gas will leak from a portion from which the joint 15 has been removed.

In this case, the female connector 52 is separated from the mating connector at the disconnected joint 15, and the keying circuit C1 is opened to insulate both detection terminals 81A and 81B of the detection circuit 80 from each other. Thus, the detection circuit 80 is actuated by turning on the ignition key, and the detection circuit 80 outputs the alarm signal. As a result, the operator notices removal of any one of the joints 15 from the blow-by gas collection piping, and the operator mounts the joint 15 on the tube 14 to prevent the blow-by gas from being discharged to the atmosphere.

Because no load is applied to the engine when the engine is actuated, the blow-by gas is not generated. Thus, when the removed joint 15 is connected to the tube 14 after the engine is actuated, it is possible to prevent the discharge of the blow-by gas.

In the connector of the first embodiment, a disconnection of the pipes 20, 40 and tube 14 causes the terminal fitting 70 and bus bars 35, 46 to be disconnected from each other. Therefore, the connector of the first embodiment can determine whether there is a disconnection of the piping by detecting the connection state of the terminal fittings. The connector portion 52 rotates around the tube 14. Thus, irrespective of whether the tube 14 twists, the connector 52 is allowed to face the mating connectors 33, 45. That is, it is easy to accomplish the connection between the connectors and the connection between the tubes. In installing the joint 15 on the tube 14, the clamping ring 60 merely is moved from the non-clamping position to the clamping position, with the tube 14 fit in the joint 15. In this manner, the joint portion 15 can be installed easily and unremovably on the tube 14. Thus, the connector has superior workability.

A second embodiment of the invention will be described with respect to FIGS. 10–16. The description will relate mainly to those aspects of the second embodiment that differ from the first embodiment. Elements of the second embodiment that are substantially the same as the first embodiment will be identified by the same reference numeral as in the first embodiment, but will not be described again.

Figure 10:
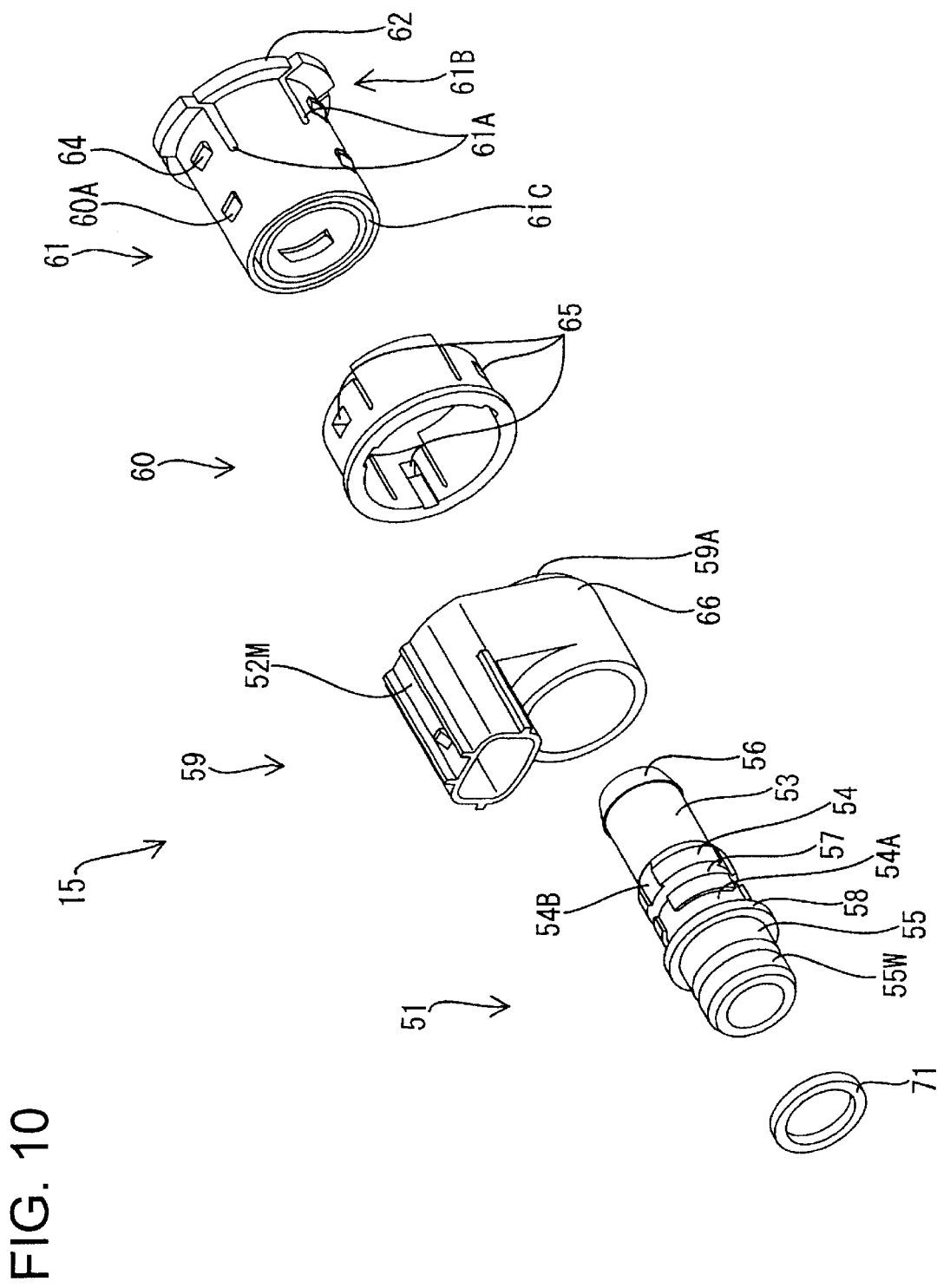
FIG. 10 is an exploded perspective view showing a joint according to second embodiment.

The joint 15, as shown in FIG. 10, includes a main cylinder 51 with a small diameter portion 53, an intermediate diameter portion 54 and a large diameter portion 55. The intermediate diameter portion 54 is formed with two projections that are arranged axially in parallel with each other and that extend circumferentially. A locking groove 57 is formed between the projections. A flange 58 is formed between the intermediate diameter portion 54 and the large diameter portion 55. The intermediate diameter portion 54 includes cylindrical section 54A between the flange 58 and the projection closer to the flange 58. Three recesses 54B are formed on each of the two projections formed on the intermediate diameter portion 54. The recesses 54B extend axially and are at circumferential positions that correspond to projections 66A of the rotary member 59 described below.

Figure 11:
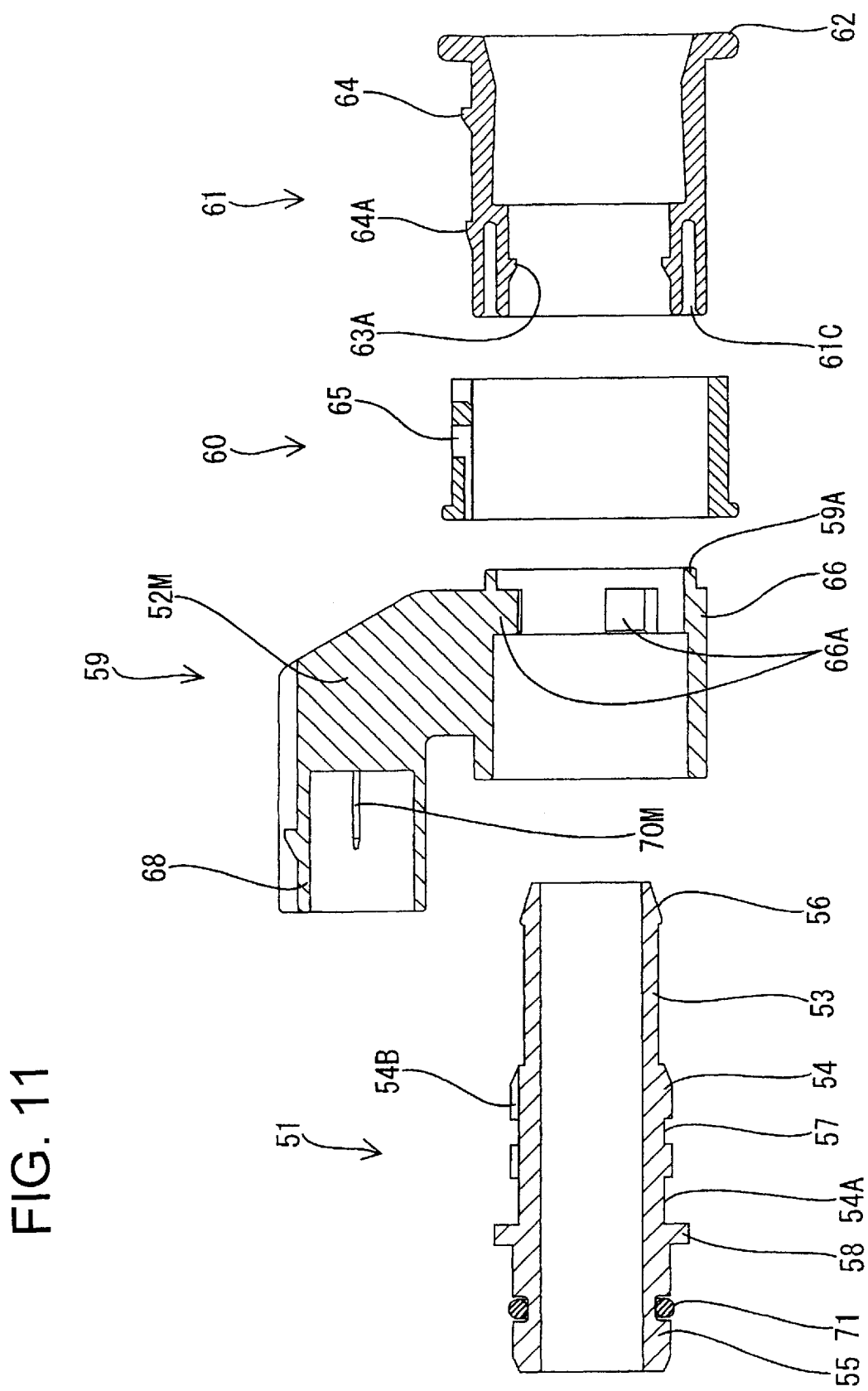
FIG. 11 is an exploded sectional view showing the joint of the second embodiment.

The rotary member 59 with the male connector 52M has a rotatable ring 66 with projections 66A formed at regular intervals on upper, right side and left side surfaces of the inner wall of the rotatable ring 66, as shown in FIG. 11. The projections 66A are aligned with the three recesses 54B and then are moved axially to the cylindrical section 54B. The rotatable ring 66 then is rotated so that the projections 66A are sandwiched between the flange 58 of the main cylinder 51 and the edge of the edge of the clamping sleeve 61 to prevent the rotary member 59 from moving axially (see FIG. 12).

The rotatable ring 66 of the rotary member 59 has a cylindrical wall surrounding the periphery of the large diameter portion 55. The cylindrical wall surrounds the entire periphery of the O-ring 71 when the rotary member 59 is installed on the main cylinder 51.

Figure 12:
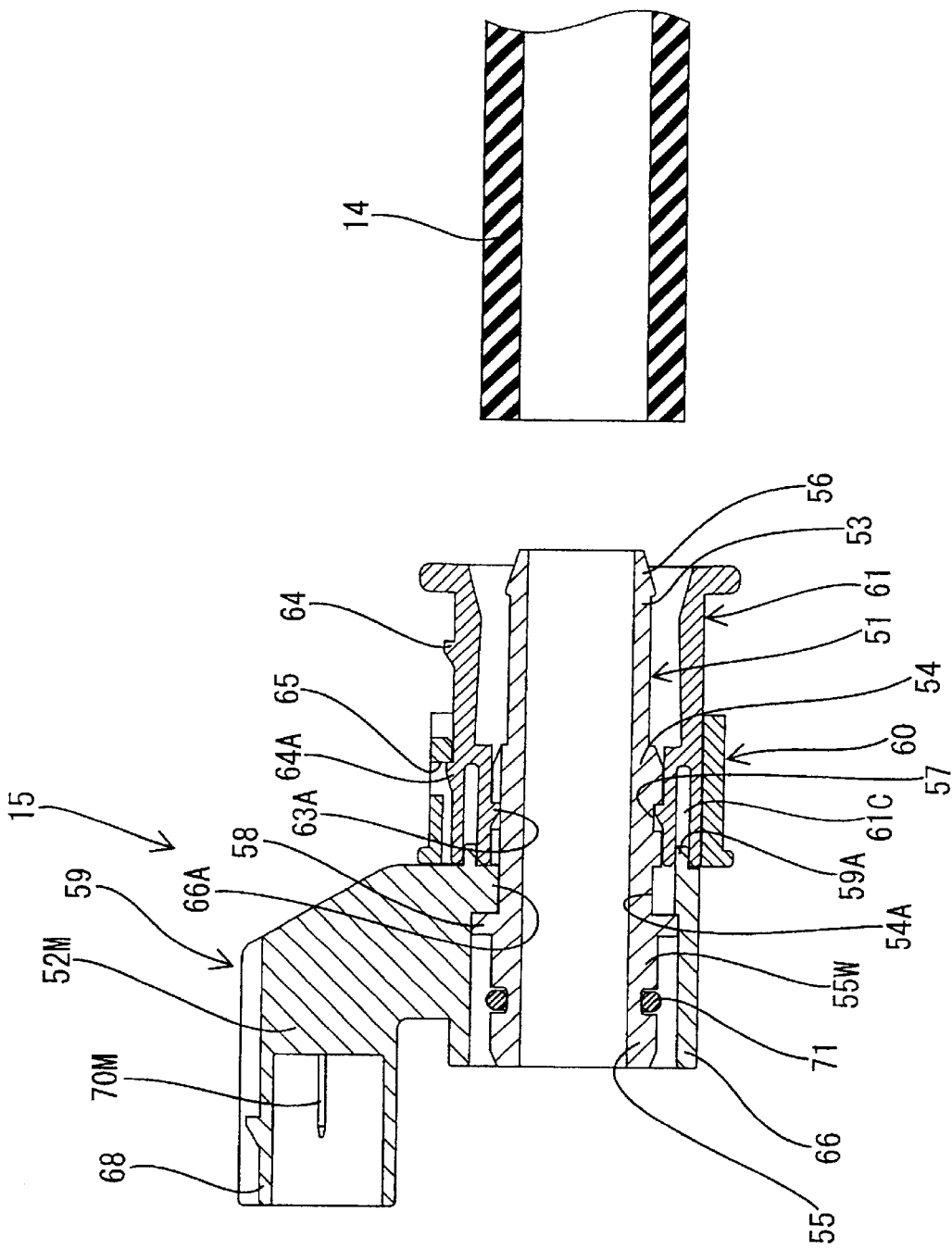
FIG. 12 is a side section view of the second embodiment showing a state before a tube is installed on the joint.
Figure 13:
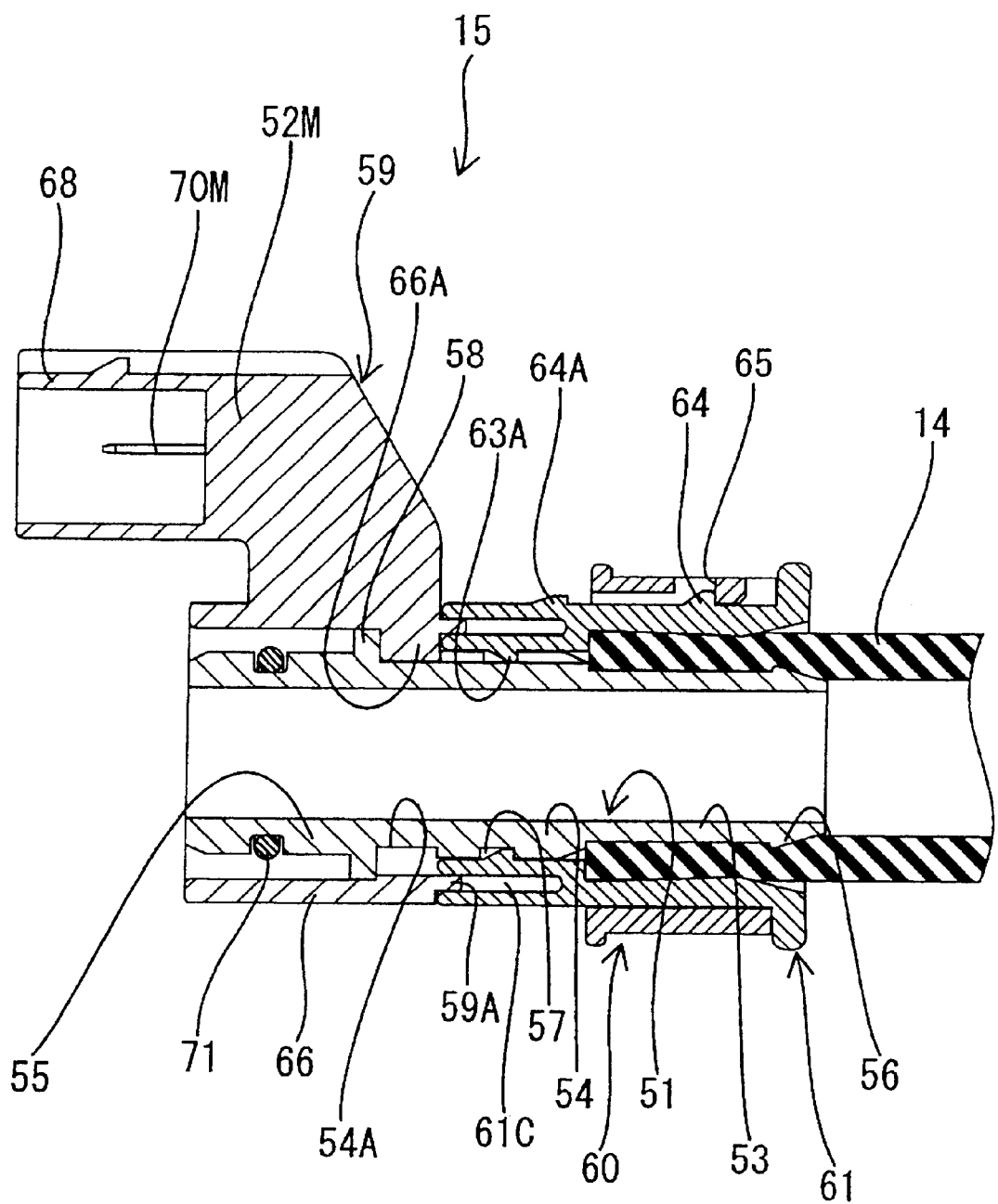
FIG. 13 is a side sectional view of the second embodiment showing a state after the tube is installed on the joint.
Figure 14:
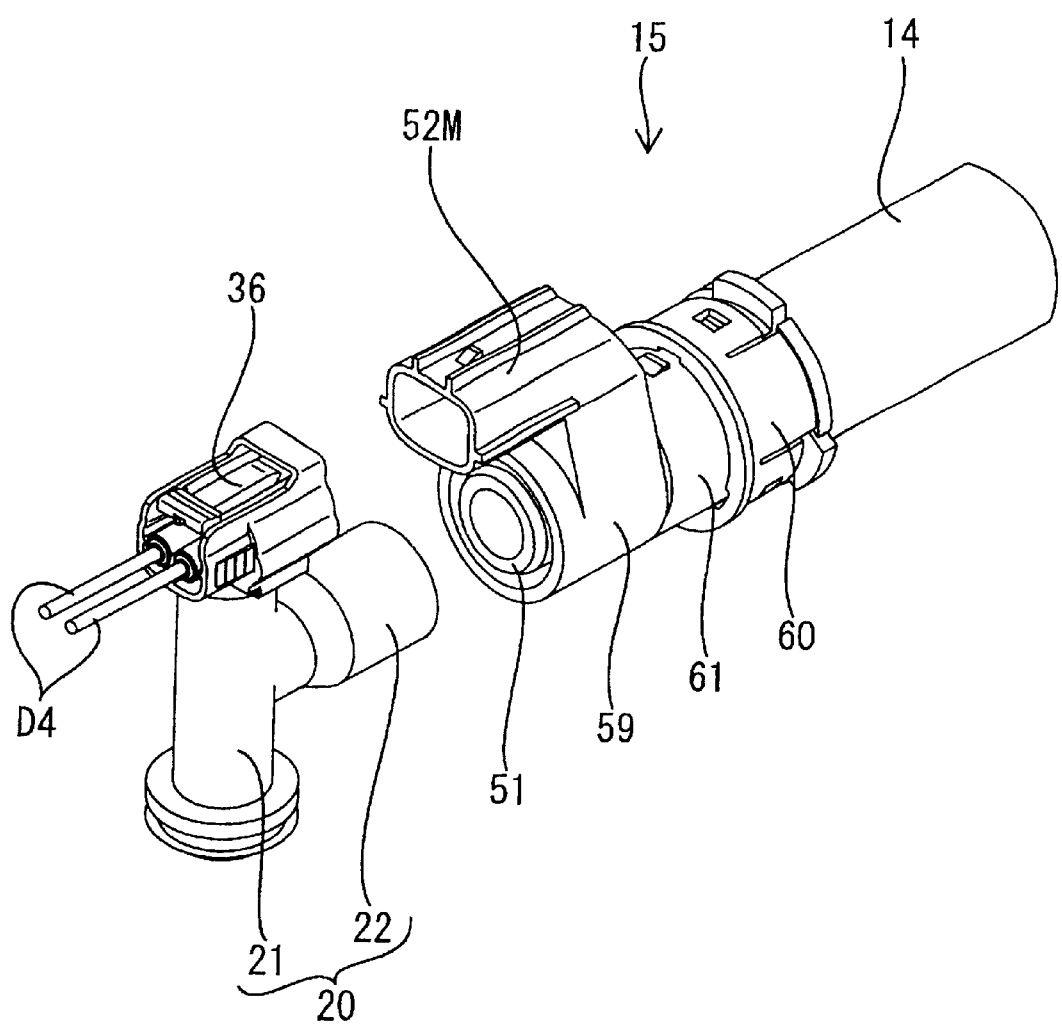
FIG. 14 is a perspective view of the second embodiment showing a state before a pipe is connected to the joint.
Figure 15:
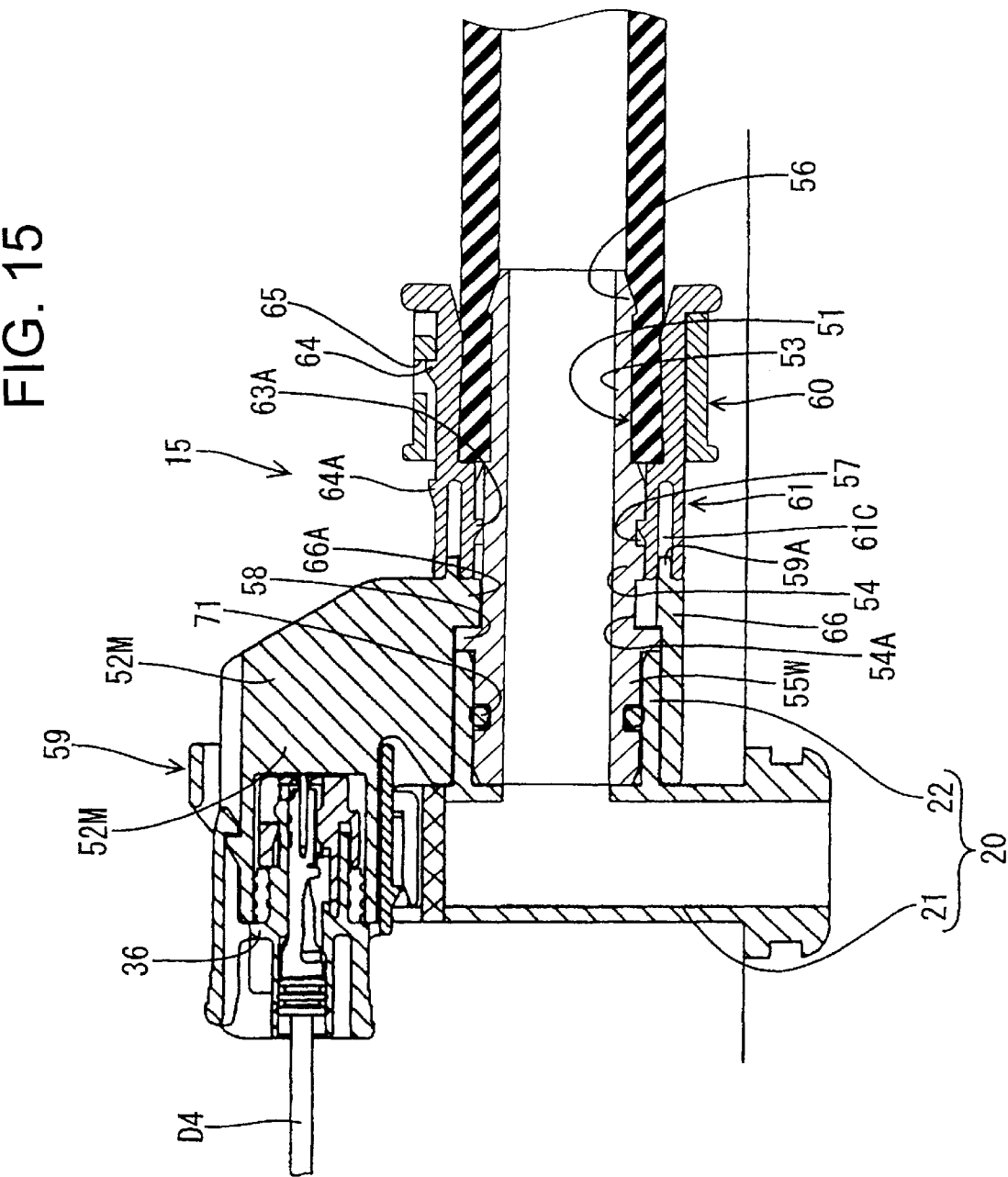
FIG. 15 is a side sectional view of the second embodiment showing a state after the joint and the pipe are connected to each other.
Figure 16:
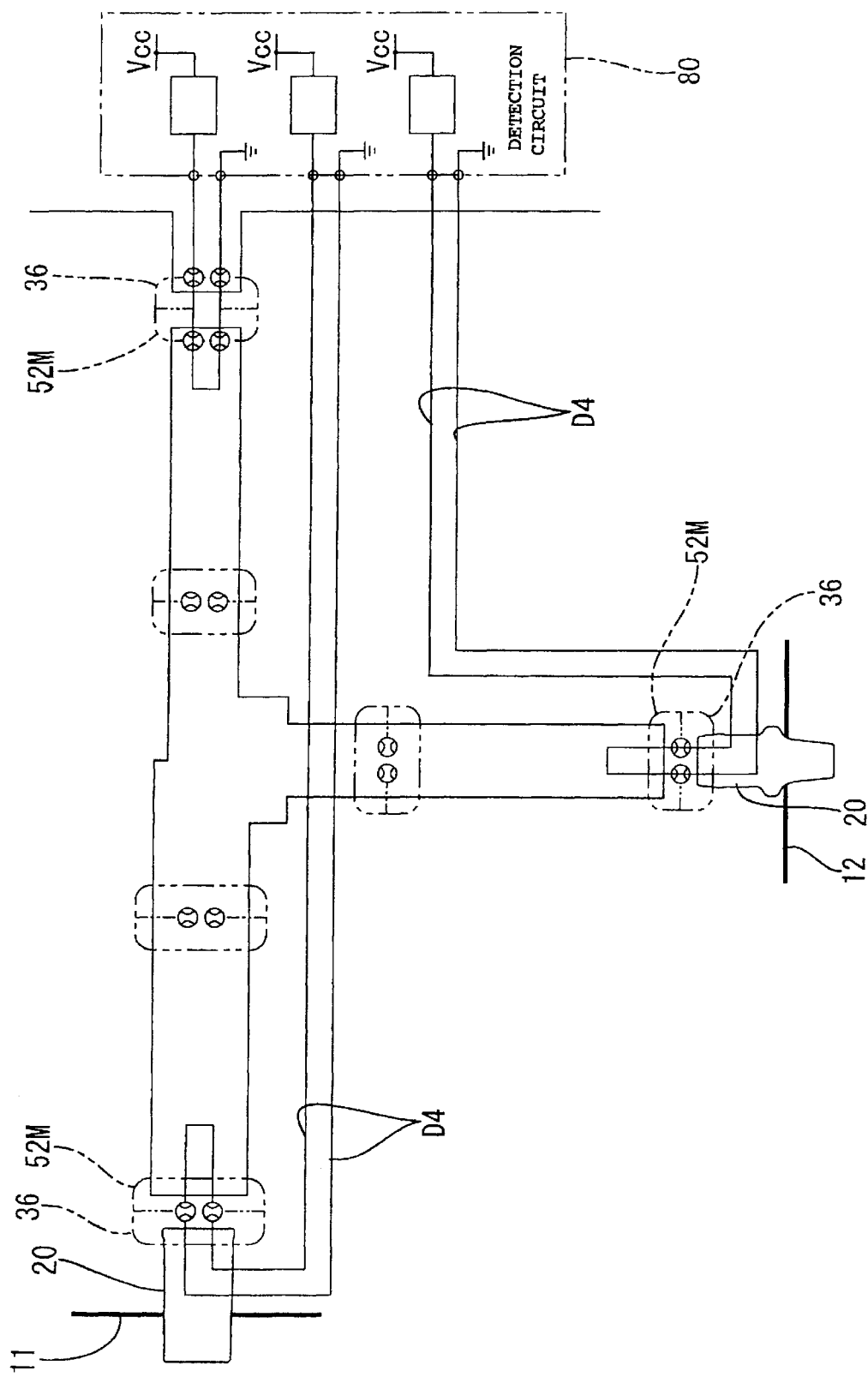
FIG. 16 is a concept view of the piping for the blow-by gas and wiring of a detection circuit.

An insertion cylinder 59A projects from the end surface of the rotary member 59 that has the clamping ring. The insertion cylinder 59A can be fit in a peripheral groove 61C at the front end surface of the clamping sleeve 61 to mount the rotary member on the clamping sleeve 61, as shown in FIG. 12.

The clamping sleeve 61 is dimensioned to fit into the clamping ring 60. Additionally, a double cylinder is formed on the side of the clamping sleeve 61 that is fit on the rotary member 59, as shown in FIG. 11. The insertion cylinder 59A of the rotary member 59 can be fit into the peripheral groove 61C formed between the inner and outer cylinders of the clamping sleeve 61.

The clamping sleeve 61 has the circumferential flange 62 at the side opposite the double cylinder. The peripheral surface of the clamping sleeve 61 has a temporary locking projection 64A that is aligned with the projection 64 in the axial direction. The locking concavity 65 of the of the clamping ring 60 is locked to the temporary locking projection 64A to hold the clamping ring 60 at the non-clamping position or temporary locking position, as shown in FIG. 12.

The male connector 52M is formed at the upper end of the square pillar 67 of the rotary member 59 in the second embodiment. The male connector 52M has an approximately U-shaped bus bar insert molded therein, such that the base of the bus bar is supported in a unitary matrix of plastic, and such that the ends of the U-shaped bus bar are exposed inside the hood 68. The leading ends of the U-shaped bus bar define the male terminal fittings 70.

The male connector 52M is disposed in the joint 15 of the second embodiment. A female connector 36 is disposed in the mating connector block 30, and an electric wire D4 extends out directly from the female connector 36.

Two electric wires D4 extend from the female connector 36 and are connected directly and in parallel to the detection circuit 80. Thus, the detection circuit 80 detects the connection of each of the female connectors 36 separately and instantly detects which connection position has a connection failure.

The electric wires D4 of the detection circuit extend from the pipe fixed to the crankcase 11 and the air intake duct 12. It is unnecessary to provide the tube 14 with electric wires. Thus, the tube 14 has a simple construction. Additionally, it is not necessary to attend to the wiring during maintenance of the vehicle. Furthermore, the tube 14 can be wired easily. For these reasons, the connector has superior workability.

The rotary member 59 of the joint 15 of the second embodiment has the cylindrical wall surrounding the periphery of the large-diameter portion 55. Thus, unlike the first embodiment, it is possible to omit the outer cylindrical wall 55V on the large-diameter portion 55. As a result, the inner cylindrical wall 55W of the large-diameter portion 55 of the second embodiment is exposed before the main cylinder 51 is assembled. Accordingly, it is easier in the second embodiment to mount the O-ring 71 on the inner cylindrical wall 55W than it is in the first embodiment. This is because in the first embodiment, the O-ring 71 is fit on the end of the inner cylindrical wall 55W that is covered with the outer cylindrical wall 55V. Further it is easy to check whether the O-ring has been installed on the main cylinder 51.

The clamping ring 60 can be locked temporarily in the non-clamping position. Thus it is possible to prevent the clamping ring 60 from slipping off the main cylinder 51 before the clamping sleeve 61 is locked to the main cylinder 51. Additionally, the clamping ring 60 is prevented from being erroneously mounted in the clamping position before insertion of the tube 14.

The insertion of the cylinder 59A into the peripheral groove 61C improves the rigidity of the joint 15 in the longitudinal direction, and prevents dust from penetrating between the rotary member 59 and the clamping sleeve 61.

The technical scope of the present invention is not limited to the above-described embodiment, but the following embodiments are included in the technical scope of the present invention. In addition to the following embodiments, the present invention can be embodied by varying the present invention in various modes without departing from the gist of the present invention.

The female connector 52 of the above-described embodiment provided on the joint 15 is rotatable. But the female connector 52 may be non-rotatable.

In the above-described embodiment, the connector of the present invention is applied to the blow-by gas collection piping. But the connector of the present invention may be applicable to any type of piping (for example, piping for flowing liquid, powder, granular material) provided that it has a connection portion.

What is claimed is:

1. A connector assembly comprising first and second connector housings that are configured respectively for connection with each other, at least one first metal fitting mounted in the first connector housing and at least one second metal fitting mounted in the second connector housing, said first and second metal fittings being configured for electrical connection with each other when said connector housings are connected, said first and second connector housings being immovably provided respectively in an axial direction on first and second tubes to electrically connect the metal fittings accommodated in said connector housings to each other by connecting said tubes to each other, said second connector housing having a ring mounted for rotation about the axial direction of the second tube, such that said second connector housing and the second metal fitting therein are rotatable about the axial direction of the second tube for facilitating alignment of the first and second connector housings.

2. A connector according to claim 1, further comprising: a stepped cylinder having a small diameter cylindrical wall fit on an inner side of said second tube and a large diameter cylindrical wall adjacent an end of the second tube, said rotatable ring being rotatably mounted on said large diameter cylindrical wall;

a flexible clamp having a slit to flexibly inwardly deform a part of said flexible clamp;

a clamping ring fit around said flexible clamp and being slidable between a clamping position at which said flexible clamp deforms flexibly inwardly and a non-clamping position distant from said clamping position; and a locking portion formed on said flexible clamp to lock said clamping ring to said clamping position.

3. An electrical connector assembly for use with first and second tubes, each said tube having an end and having an axis extending from said end, said tubes being selectively connectable with one another and being selectively disconnectable from one another, said connector assembly comprising a first connector mounted in a fixed axial position externally of said first tube and a second electrical connector mounted in a fixed axial position externally of said second tube, said first and second electrical connectors being connected to one another when said tubes are connected, and said first and second electrical connectors being disconnected from one another when said tubes are disconnected, said second electrical connector being rotatable around said axis of said second tube for facilitating alignment with said first electrical connector, whereby disconnection of said first and second electrical connectors is detectable by an electrical detection apparatus for signaling disconnection of said tubes.

* * * * *